Jan. 20, 1970    W. A. FARRAND    3,491,347
SERVO SYSTEM FOR POSITIONING TRANSDUCERS AT TRACK LOCATIONS
Filed March 20, 1967    6 Sheets-Sheet 1

FIG. 1

INVENTOR.
WILLIAM A. FARRAND
BY
*Robert G. Rogers*
ATTORNEY

Jan. 20, 1970     W. A. FARRAND     3,491,347
SERVO SYSTEM FOR POSITIONING TRANSDUCERS AT TRACK LOCATIONS
Filed March 20, 1967     6 Sheets-Sheet 2

INVENTOR.
WILLIAM A. FARRAND
BY
ATTORNEY

FIG. 3A

INVENTOR.
WILLIAM A. FARRAND

FIG. 3B

INVENTOR.
WILLIAM A. FARRAND

FIG. 4B

INVENTOR.
WILLIAM A. FARRAND

FIG. 5

INVENTOR.
WILLIAM A. FARRAND

United States Patent Office 3,491,347
Patented Jan. 20, 1970

3,491,347
SERVO SYSTEM FOR POSITIONING TRANSDUCERS AT TRACK LOCATIONS
William A. Farrand, Fullerton, Calif., assignor to North American Rockwell Corporation, a corporation of Delaware
Filed Mar. 20, 1967, Ser. No. 624,507
Int. Cl. G11b 5/00, 21/08, 21/10
U.S. Cl. 340—174.1
7 Claims

ABSTRACT OF THE DISCLOSURE

A servo system for driving transducer positioning members with error signals derived from characteristics associated with data recorded on storage tracks. Transducers connected to the positioning members read stored data from recording tracks, and as the transducers are driven across the tracks, signals are derived for determining the position of the transducers with respect to the tracks. The stored data are provided characteristics so that as the transducer is moved across the tracks, a cyclic variation in identification of recording tracks can be made to occur.

The tracks have a width relative to the width of the transducer so that detectable amounts of signals are picked up from adjacent tracks when the transducer is nearly centered over one track. Appropriate filtering and logic circuitry provides a signal corresponding in sign and magnitude to the difference in amplitude of the adjacent track signals.

BACKGROUND OF THE INVENTION

Field of the invention

The invention relates to a servo system for positioning transducers with respect to one or more recording surfaces and, more particularly, to such a system for deriving track identification from the recorded information and for developing error signals from the recorded tracks to permit centering the transducers with respect to the recorded tracks.

Description of prior art

Applicant is unaware of any art which relates directly to the system described herein, although Patent No. 2,054,806 to E. H. Bush for an Electromagnetic Control Device and a patent application referred to in column 4, line 46 of Patent 3,298,009 to E. G. Domich for a Head Mounting and Positioning Apparatus for Written Access Disc Memory Systems appear to be the closest art. Neither patent teaches a servo system.

The Bush system teaches a coarse digital positioner constructed to have ten discrete positions a fixed distance apart. Each of the positions may be selected by energizing a pair of leads to energize an appropriately located coil to attract the armature of a positioner to a selected location.

The referred patent application teaches a fine digital positioner constructed to have ten operating positions spaced apart the same distance as those of the coarse positioner. The ratio of shaft to arm movement is such that a combination of ten coarse and ten fine positions can position the arm to any one of 100 different combinations.

Prior art systems depend on separate elements for defining the location of the positioning member. The elements may be mechanical or electrical and may depend on separate position actuators or transducers. Such systems lead to residual uncertainty in the location of the transducers relative to the recorded tracks as a result of accumulated tolerances, variations in dimensions, thermal expansions, etc., and inaccuracies in the position detecting devices. As a result, the systems normally are provided with buffer zones between tracks and the tracks are recorded at a width greater than that used for read back of the information so that positioning inaccuracies do not materially effect the amplitude of the read signals.

By permitting transducer position to be determined directly from information in the recorded tracks, the present invention eliminates the requirement for the buffer zones and the difference between recording and reproducing track width. It also reduces the weight of the positioning system by eliminating the separate elements necessary for determination of transducer position in the prior art systems. Thus, a greater track density is possible and transducer positioning can be accomplished with a smaller expenditure of power for a given speed of track change. Elimination of the buffer zones results in a small amount of "crosstalk," or interference, between adjacent tracks. However, crosstalk is used in the positioning system to provide the centering signal for accurately locating the head to minimize the effects of crosstalk.

The potential desirability of such a system is obvious, but it has previously been considered an unattainable goal because of problems of deriving suitable servo control signals and of preventing drift of the recorded tracks in the presence of cross-track recording bias. The present invention provides a solution to the first of these problems by the detection of characteristic differences in tracks and to the second by making use of otherwise necessary permanent records as a final check on track centering.

SUMMARY OF THE INVENTION

Briefly, the invention comprises a servo system for positioning transducers at the centers of recording tracks on one or more recording sufarces by deriving servo control signals from information recorded in the tracks. The transducers are connected to a positioning member which is capable of moving them substantially parallel to the recording surfaces and transverse to the direction of surface motion used in recording.

The system comprises means for recording data on successive tracks such as to provide a minimum of three characteristically distinct record patterns which occur in cyclic order (123123123, etc.) independent of the recorded data. As an example of one mode which could be used to provide the minimum of three distinct characteristics, the data could be recorded by amplitude modulation of carrier frequencies. By making use of three distinct carrier frequencies, the signals read back from the different tracks could be separated by appropriate tuned filters so that the order number of the track or tracks from which signals were being read could be distinguished.

However, for convenience in use with data recorded by essentially DC methods in digital form, a more convenient system provides four distinct signal combinations. These four are repeated in cyclic order as the positioning member moves across the recording surface. Thus, in one direction the order in which the signals are perceived is 1234, 1234, etc. whereas with the reverse motion the order of perception is 4321, 4321, etc.

By keeping track of the past action of the transducers and noting whether the maximum signal being read at a given time corresponds to character 1, 2, 3 or 4, the location of the transducers relative to the recording surface is known to within one track width. By comparing the crosstalk signals from adjacent tracks, centering information can be derived to permit transducer location to the actual track center. For example, with the transducer on a track 4, and more track 3 signal is picked up than track 1 signal, the centering error will be a function of the magnitude of the difference in these two signals and will be in a direction to cause the positioning member to move the transducers "up scale." Conversely, a greater signal from track 1 than from track 3 would indicate that motion "down scale" was required. When signals from tracks 1 and 3 are equal, the transducer is positioned over the center of track 4. It will be noted that the same combination of 1 and 3 would also be used for centering on track 2 but with a reverse interpretation of the directional information. Thus, it is necessary to know which of the tracks are involved in order to make proper use of this fine centering.

While it is possible to provide a multiplicity of characteristically different signals to be read by a single transducer, the specific embodiment described herein comprises a pair of transducers on a single positioning member reading different tracks to permit coding of data by timing relative to only two time-separated clock signals in order to provide the four characteristically different signal combinations.

As the transducers are positioned across the recording surface(s), signals from the transducers are compared by logic means. An error signal is generated for driving the positioning member until the correct combination (track carrier and accumulated track number) as derived from the recorded tracks, is read. When the correct combination is read and the crosstalk signals are balanced, the error signal becomes zero, and the transducers are secured in position.

Pluralities of recording surfaces and associated positioning members may be included in a single system. In most embodiments, the initial error signal is derived by subtracting the desired track position from the present track position. However, after the member is positioned on the desired track, the track centering signal becomes a function of the position indicated by adajcent track pickup.

Therefore, it is an object of this invention to provide a servo system for positioning transducers at the centers of recording tracks.

Another object of this invention is to provide a servo system for positioning transducers at the centers of selected recording tracks by deriving positioning signals from the characteristics of information recorded on the tracks.

It is still a further object of this invention to provide a system in which track density is increased and in which magnetic interference defects are reduced.

It is still a further object of this invention to provide a system which has an increased tolerance to temperature variation as a result of the increased precision in positioning transducers with respect to the recording tracks themselves.

It is still a further object of this invention to provide a system in which the weight of the transducer positioning members is reduced by decreasing the number of parts required.

A still further object of this invention is to provide a system in which the recorded data comprises signals for permitting centering of transducers with respect to recording tracks on the recording surface(s).

A further object of this invention is to provide an improved recording and reading system wherein clocks used in recording data on adjacent sets of recording tracks of a parallel set of recording surfaces, have a phase relationship between sets of adjacent tracks and between recording surfaces for permitting transducers to be centered with respect to the recording tracks.

These and other objects of this invention will become more apparent in connection with the following drawings.

DESCRIPTION OF PREFERRED EMBODIMENTS

Figure 1:
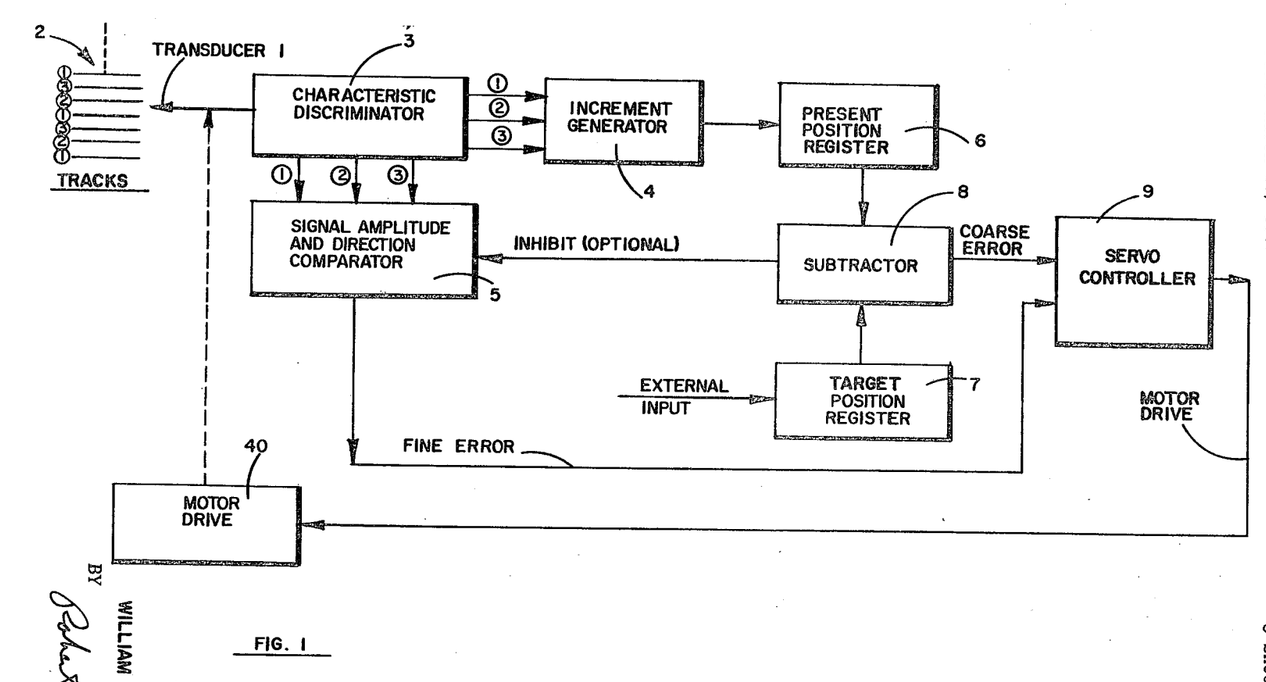
FIGURE 1 illustrates a functional diagram of one embodiment of a servo system for driving a transducer to a selected track position and for centering the transducer with respect to the recording track.

FIGURE 1 illustrates a servo system for positioning transducer 1 with respect to a group of tracks 2. The data on the tracks is coded in cyclic order as indicated be the circled numerals 1, 2, 3, etc. by means such as different carrier frequencies, special record elements, or other suitable means. For purposes of this description, separate means, not shown, are assumed to be provided for recording data. Transducer 1 is disposed for moving in a direction transverse to the tracks and includes a capability for reading signals from the tracks during such motion.

The transducer is connected to characteristic discriminator 3 which includes means for distinguishing the identifying characteristics of the tracks and separating signals in accordance with the track from which the signals originate.

Increment generator 4 is connected to receive output signals from the discriminator. The generator comprises means for identifying a transition from the characteristic associated with one track to the characteristic associated with another track. The generator provides a "plus" output signal if the transistion is to be a cyclically higher number and a "minus" output signal if the transition is to be a cyclically lower number. The signals are transmitted to present position register 6 for changing the register so that the contents of the register numerically correspond to the number of the track approximately under the transducer at any one time. Register 6 provides one input to subtractor 8. Another input is provided from target position register 7 which contains the track number at which the transducer is to be located. The number in the target position register is received from an external source such as a computer or other connected device.

The subtractor 8 subtracts the number in register 6 from the number in register 7 and provides a difference signal including the sign of the difference as a coarse error signal to servo controller 9. The sign of the error signal is, for example, positive if the required direction of transducer motion is toward a higher number and is negative if the required direction of transducer motion is towards a lower number. Servo controller 9 which may, for example, be a two speed servo controller, is connected to motor drive 40. The controller generates a motor drive signal having an appropriate sign (and if desired, magnitude) for driving the transducer in the required direction until the difference signal from the subtractor is zero.

In addition to the incremental generator, signal amplitude and direction comparator 5 is connected to discriminator 3 for identifying residual adjacent track signals and comparing the relative amplitude of the signals. It generates a fine error signal to the controller. The magnitude and sign of the signal is a function of the difference in amplitude of signals from adjacent tracks. The controller generates a motor drive signal. An inhibit signal may comprise an input to the comparator whenever the contents of subtractor 8 differ from zero by a specified tolerance. The inhibit signal may be used for safety and durability in system operation. The design of circuitry required to mechanize the various blocks in the diagram depends on the nature of the signal characteristics chosen and is within the capabilities of one having ordinary skills in the art.

Figure 2:
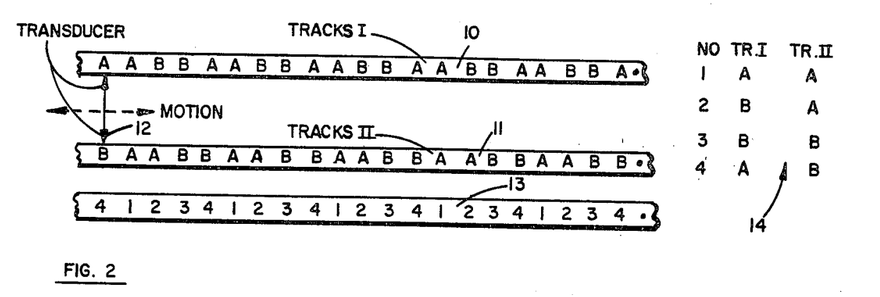
FIGURE 2 illustrates two transducers being positioned relative to two sets of tracks showing a cycle of four track identification characteristics generated by two identifying characteristics.

FIGURE 2 shows symbolically the method by which two different signal characteristics recorded on two synchronized sets of tracks provides the equivalent of a four-step cyclic signal array. Strip 10 represents a group of tracks (identified as tracks I) whose characteristics are identified by the letters A and B. These tracks are recorded as indicated with adjacent pairs being recorded with the same characteristic and with alternate pairs having alternating characteristics. Strip 11 is a similar representation of a group of tracks (identified as tracks II), similarly recorded, but with a one-step offset relative to strip 10 as seen by the transducers.

Transducers 12 are mounted for motion in the indicated direction so that both advance together from track to track. At the point indicated by the figure, the transducer associated with tracks I is reading an A characteristic, and that associated with tracks II is reading a B characteristic. Strip 13 indicates the equivalent cyclic order shown by the numerals 1, 2, 3, 4, etc., and the table 14 shows the correlation between the numerals 1, 2, etc. and the combination of characteristics read from tracks I and II. This particular combination is advantageous because the characteristics automatically indicate the two least significant bits of the track numeral without necessity for completely incremental counting. Thus, the transfer of information from the equivalent of the character discriminator shown in FIGURE 1 to the present position register is in the nature of a carry from this two-bit binary data.

Figure 3A:
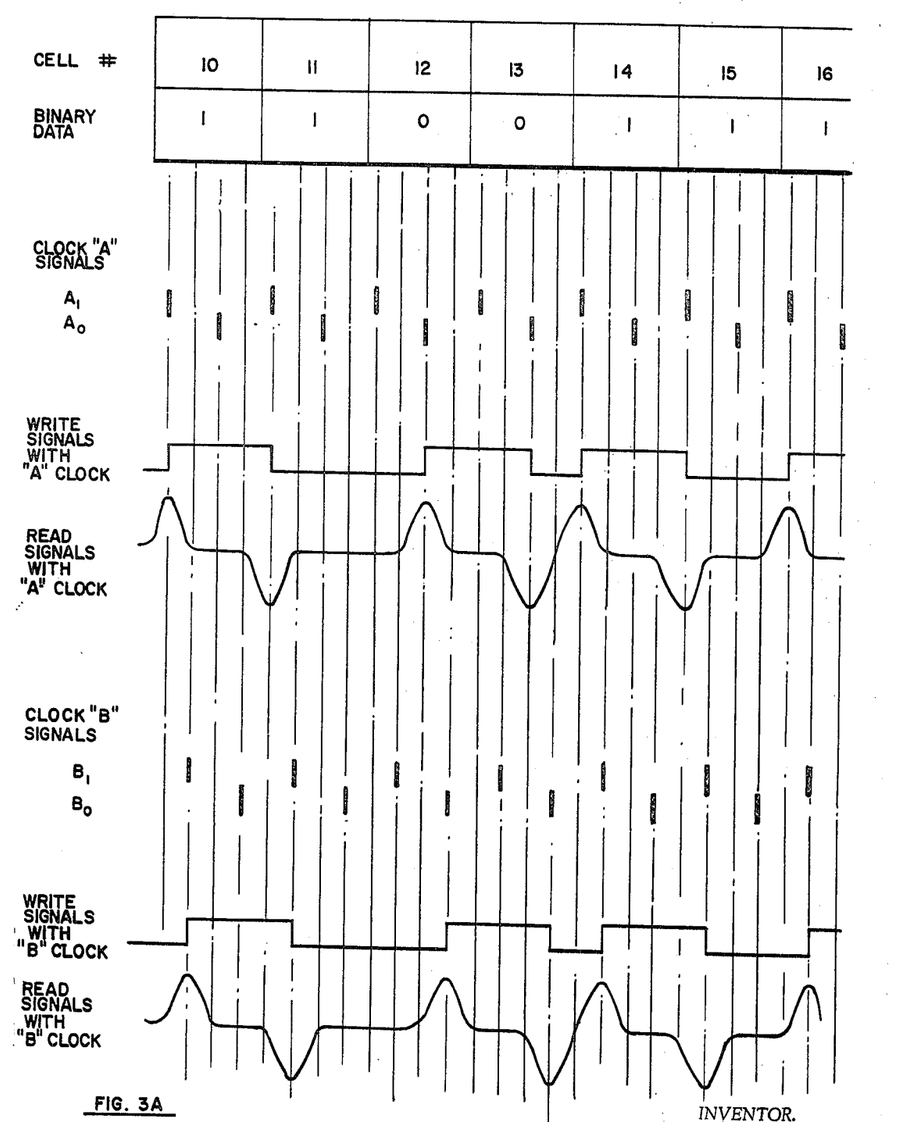
FIGURES 3a and 3b illustrate two methods of recording on tracks by use of time-phased clocks to provide track distinguishing characteristics.

FIGURE 3a shows a specific example of how data can be encoded with additional information for identifying tracks. Two sets of clock signals, $A_1$ or $A_0$, and $B_1$ or $B_0$, are used in the specific non-return to zero phase method described.

The $A_1$ signals occur at regular intervals. The $A_0$ signals occur at intervals between the $A_1$ signals. In effect, the normal clock interval is divided in half. The B signals have the same relative spacing except that the B signals are shifted to the right of the A signals so that there is a phase difference between the signals. A phase difference of, for example, 15° may be provided between the signals. The shift should be great enough to accommodate tolerances or shifts in the signals due to the inherent limitations of the system components. The optimum phase difference is normally near 90°.

In order to illustrate the system, an example of a specific bit pattern (portion of a continuing record) is shown recorded on an arbitrary set of cells (10 through 16) of a recording surface. This sequence is shown as it might be recorded on both an A and a B track. Generally, the system operates by changing the direction of flux during the $A_1$, $A_0$, $B_1$ or $B_0$ clock interval. When the recording bit is a binary "1," the flux change is during the "1" time (A or B), and when the recording bit is a binary "0," flux is changed at "0" time (A or B). In other words, when writing, the transducer current is reversed during the clock time corresponding to the bit value. Therefore, a change should occur in the A and B write signals at $A_0$ or $B_0$ clock times during cell time 12 and 13. A change should also occur in the A and B write signals at $A_1$ or $B_1$ clock times during cell times 10, 11, 14, 15 and 16. The write signal does change direction at the various clock times and definitely changes once and only once during each cell time. This is true for both the A track and the B track. When a record such as shown in FIGURE 3a is read, a pulse occurs which reaches a maximum in absolute value at a clock time corresponding to the recorded bit. The polarity of the read signal is not significant.

Figure 3B:
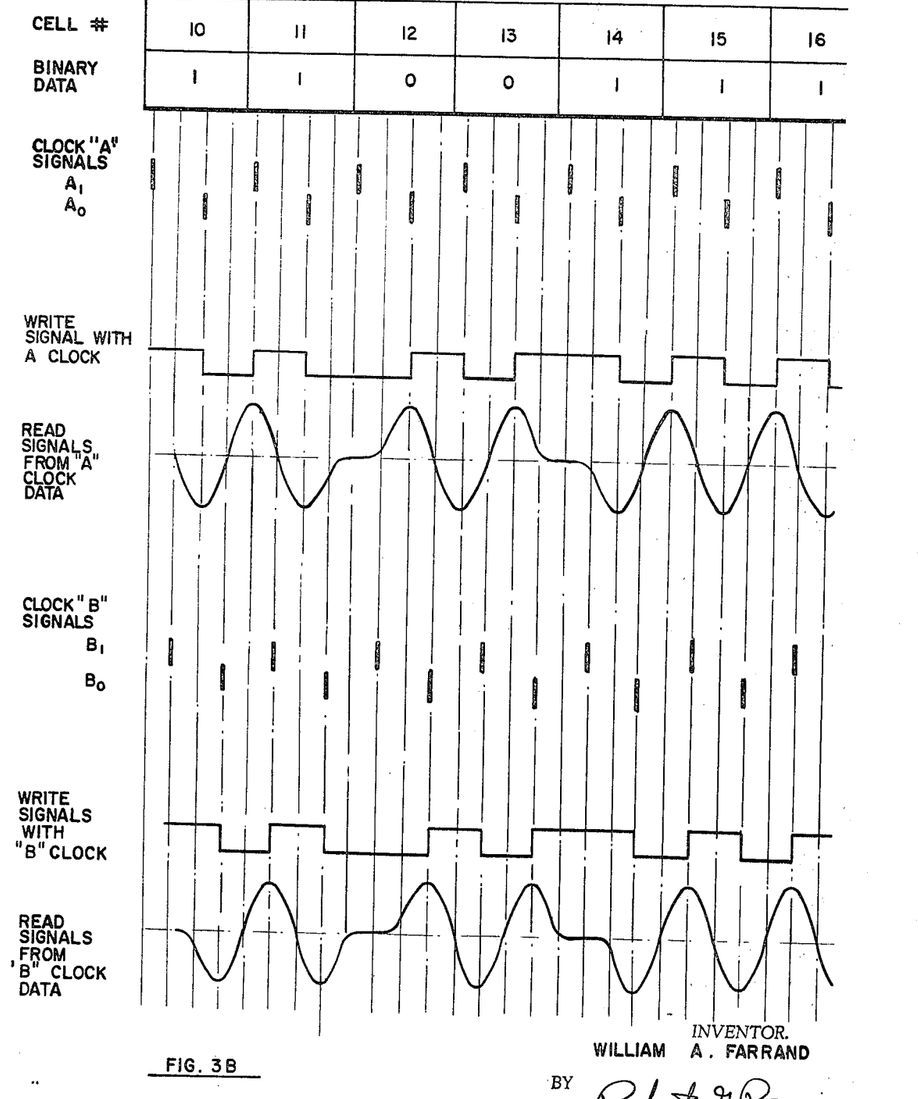

FIGURE 3b shows a different method of recording the same set of data with the same clock arrangement. In this case the significant factor is the relative phase of the recorded signal. To record a "1," the flux reverses in a direction indicated as positive in the figure at clock time "1," and reverses in the opopsite direction at clock time "0." To record a "0," the converse situation occurs with flux reversing positive at "0" clock time and reversing negative at "1" clock time. The read signals resulting from this configuration approximate a piece-wise sinusoidal signal (at high cell density) in which the maximum absolute values occur substantially at the respective clock times with the value (+, −) at "0" clock time corresponding to the recorded bit (1, 0). It will be understood that complete inversion of interpretation of the figure is equally valid, i.e., that the 0–1 colding of positive and negative directions is arbitrary.

While examples have been used which indicate recording of the same signal on A and B tracks, it was done for drawing convenience only. Normally, data on different tracks is essentially independent. The invention is not intended to be limited to the specific recording methods illustrated.

Figure 4A:
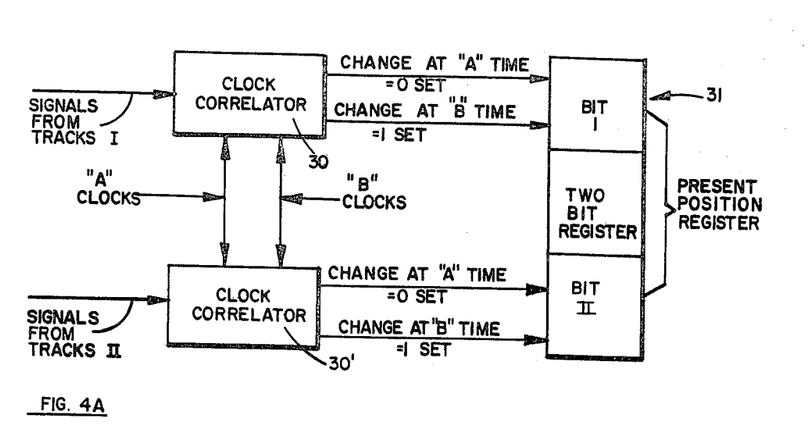
FIGURES 4a and 4b illustrate an embodiment of means for processing characteristics shown in FIGURES 2 and 3 to provide four step cyclic track identification and centering signals.

FIGURE 4a shows one system for interpreting signals in accordance with FIGURE 3a to provide a cyclic number count of tracks in accordance with the scheme of FIGURE 2. The embodiment could be used to increment a binary number contained in a present position register. Considerations must be made, however, for the cyclic characteristics. FIGURE 3a concerns a four character cycle. The FIGURE 1 system is based on a three character cycle. Signals from the two transducers are supplied to clock correlators 30 and 30' which are also supplied with signals from the two clocks as indicated. For purposes of this operation, the correlators supply signals in the form of pulses on two output lines in accordance with the time at which a change in flux is indicated by a maximum read signal. These pulses serve to set the individual bits in a two-bit register 31 to either a "0" or a "1" state as indicated. The register may comprise conventional flip flops or bistable circuits well known in the art. The correlators and register may be used for a portion of the track identification logic 21 and track change logic 22 of FIGURE 5 (to be described subsequently). By reading out the binary number contained in this register in accordance with the truth table given below, the cyclic number from 1 to 4 of the track pair may be identified.

TRUTH TABLE

| Bit I | Bit II | Cyclic number |
| --- | --- | --- |
| 0 | 0 | 1 |
| 1 | 0 | 2 |
| 1 | 1 | 3 |
| 0 | 1 | 4 |

The clock correlators of FIGURE 4a convert the input signals from the tracks being traversed into digital outputs. The correlators correlate the clock signals with the signals from the track to provide a digital output as indicated in the figure.

Figure 4B:
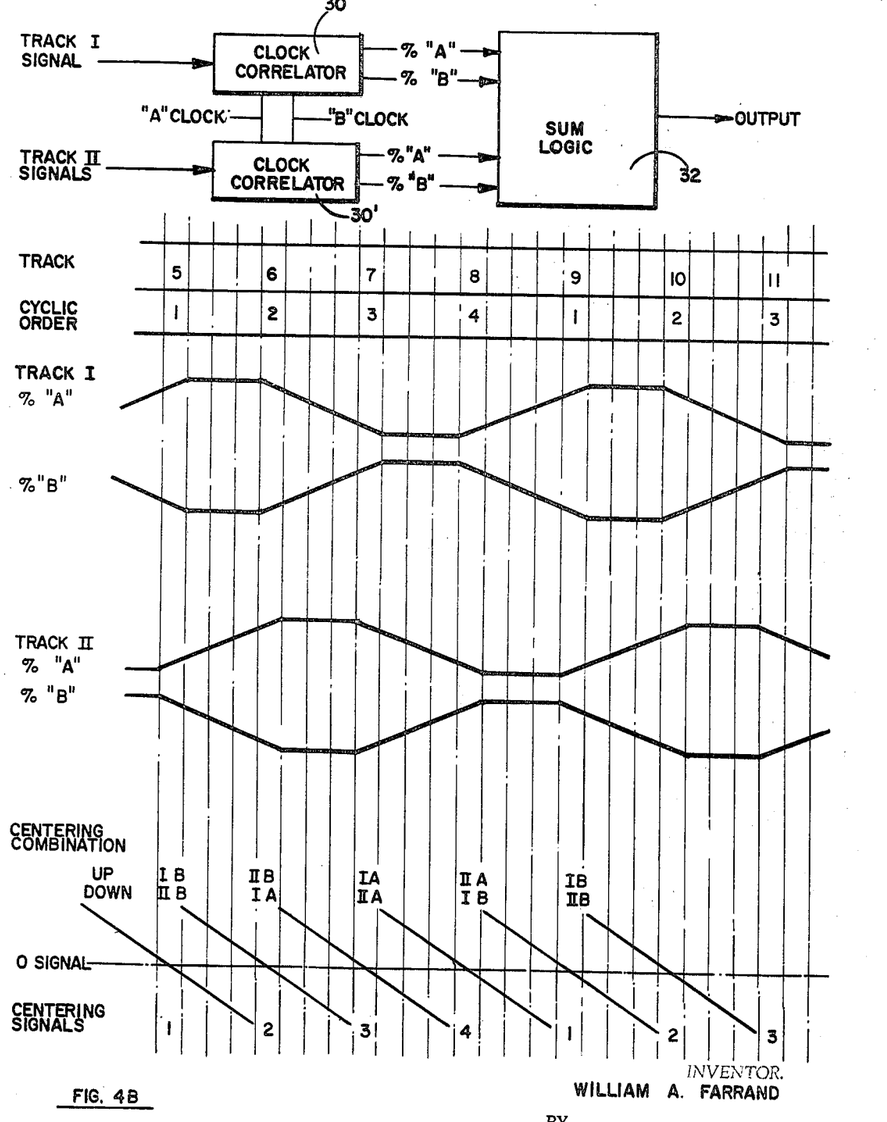

FIGURE 4b illustrates one embodiment of a system for deriving centering signals from a set of data generated, for example, by the clock correlator shown in the FIGURE 4a system. For a three character cycle, the FIGURE 4b embodiment could be used as the comparator 5 in FIGURE 1. For a four character cycle, the embodiment could be used in lieu of cyclic order switch 23, rectifiers 26 and 27, and differential amplifier 28 described in FIGURE 5. In this case the signals derived from the clock correlators are proportional to the percentage of track A or track B signal being received. These percentages are schematically diagrammed as they woulld be received during the transition of the two read transducers across a sequence of tracks. Sum logic 32 sums the signals corresponding to the cyclically next higher and next lower tracks. Substantially linear centering signals are generated as indicated in the last row of FIGURE 4b, by using as positive drive the signal from the "up" channel, and as negative drive the signal from the "down" channel. These signals pass through zero when the transducers are positioned on center of the middle track as indicated by equality of the adjacent track signals, and are proportionate in both magnitude and direction to any deviation from such centering. Which set of channel signals is used in any given case depends on the cyclic order number of the track over which centering is to take place, as indicated by the numerical designations.

The clock correlators 30 and 30′, shown in FIGURES 4a and 4b, are phase discriminators or phase detectors.

The clock correlators of FIGURE 4b are analog devices for correlating the signals received from the tracks I and II with the A and B clock signals as the transducers traverse the tracks. The correlated outputs are analog voltages, as indicated in the figure. The analog voltages are roughly proportional to the amount of the signals from adjacent tracks which are picked up by the transducers.

In analog systems correlators are used in single side band receivers and carrier suppressed modulators. References may be found in text books such as Electronic and Radio Engineering, Terman, McGraw Hill (1955). Specifically, a synchronous detector is illustrated on page 1008, Figure 25–26 of the text; a phase detector is illustrated on page 1010, Figure 25–27 of the text; an additional detector is shown on page 957, Figure 24–18b.

For the digital system shown in FIGURE 4a, the correlators can be implemented by And gates or by well-known pulse coincidence detectors.

The sum logic 32 may be implemented by conventional adders implemented by shift registers and flip flops. The digital inputs are added and provide an overflow at the end of each cycle for changing a coarse positioning signal.

Figure 5:
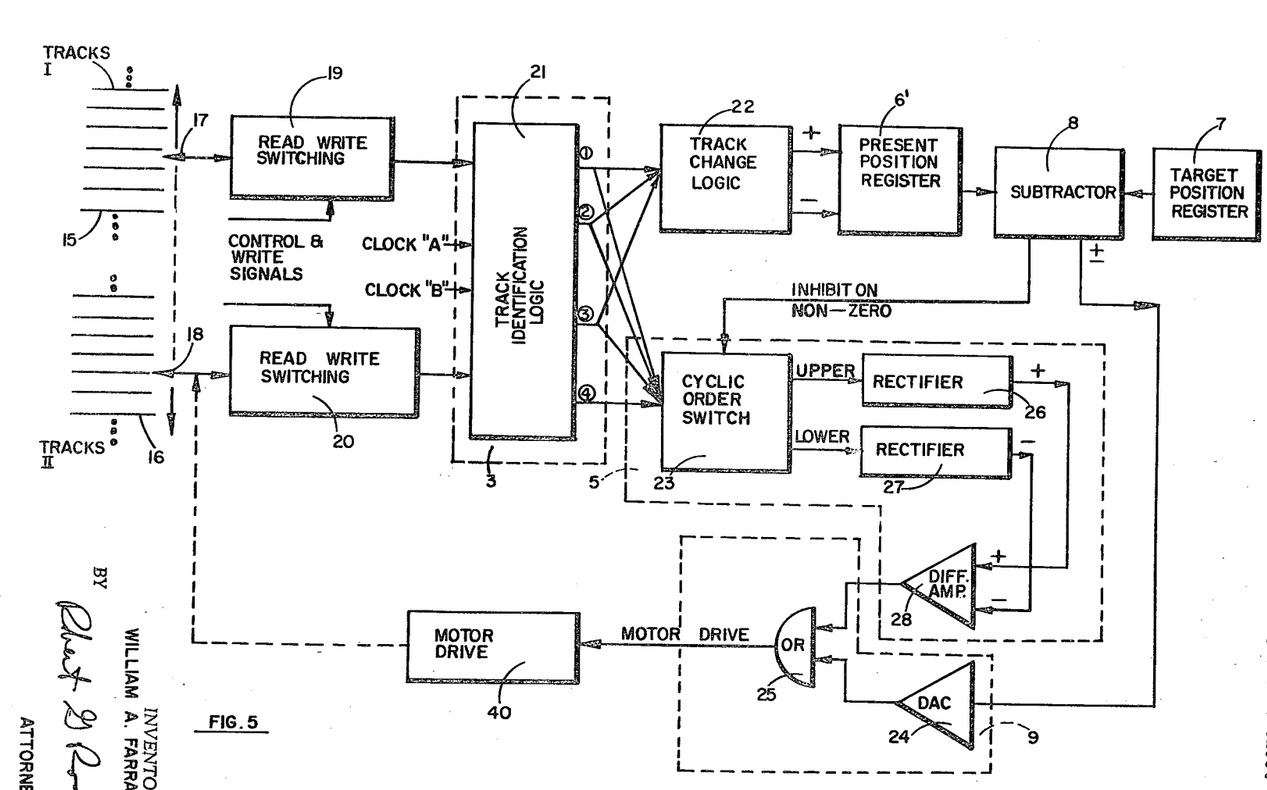
FIGURE 5 illustrates one embodiment of a system for positioning a plurality of transducers by using control signals derived as exemplified in FIGURES 4a and 4b.

FIGURE 5 illustrates a more specific embodiment of a servo control system for developing coarse and fine control signals from the characteristics of data recorded on the tracks as described in connection with FIGURES 2, 3 and 4. Two sets of tracks, identified as tracks I and II, are indicated at 15 and 16. Transducers 17 and 18 are positioned adjacent to the tracks for reading information stored on the tracks. Motor driver 40 is connected for simultaneously moving the transducers in a transverse direction with respect to the tracks. The transducers are connected through read-write switch and amplifiers 19, 20 (which permit use of the same transducers for both purposes) to discriminator 3 which comprises track identification logic 21. The amplifiers receive control and write signals from other parts of the system, together with data signals when data writing is required. The readout signals are transmitted to the track identification logic 21 which also receives signals from clocks A and B. Logic 21 produces signals corresponding to track characters 1, 2, 3 and 4 on separate output lines to the track change logic 22 and to the cyclic order switch 23.

Track change logic 22 provides the two least significant bits of the track number determined by the combination of information read from the two transducers and supplies overflow to the present position register 6′. The combination of 6′ and 22 is equivalent to the register 6 shown and described in connection with FIGURE 1, since overflow comprises an increment of the next least significant bit of the track identification number.

Target position register 7 and subtractor 8 function substantially as described in connection with the FIGURE 1 embodiment. The magnitude and sign of the contents of subtractor 8 are transmitted to servo controller 9 simplified herein as including digital to analog converter 24 and OR gate 25. The output of the controller passes through the OR gate to furnish a coarse transducer positioning signal to motor driver 40.

Cyclic order switch 23 selects those signals received via track identification logic from adjacent tracks of the complete record and directs them as required to rectifiers 26 and 27. The subtractor is also connected to cyclic order switch 23 to inhibit its function during coarse positioning (when contents of subtractor 8 differ from zero by a predetermined amount). Rectifier 26 rectifies signals delivered from switch 23 which indicate that the transducers need to be moved towards the next higher order track. Rectifier 27 rectifies signals from switch 23 which indicate that the transducers need to be moved towards the next lower order track.

The output from the rectifier comprises inputs to differential amplifier 28. The output signal from the differential amplifier comprises a fine positioning signal. Thus, the combination of elements 23, 26, 27 and 28 serve the function of signal amplitude and direction comparator 5 shown in FIGURE 1. If preferred, appropriate scaling of the coarse and fine error signals can provide the equivalent of a switched two-speed system such as shown in FIGURE 5 without actual switching. Such modifications are well known in the servo art.

Details of the various elements shown in FIGURE 5 are considered to be normal engineering practice which can be designed by anyone skilled in the art of digital electronics. While a specific embodiment has been indicated, it will be recognized that equivalent functions may be accomplished with other detailed elements which are therefore within the scope of the present invention.

Furthermore, while the technique described is adequate to provide centering on any data recorded on groups of tracks as described, it is possible for residual biases in the symmetry of recording or reading patterns of the transducers to cause eventual drifting of track locations after repeated track-seek, write, track-seek, write, . . . . In any normal auxiliary storage scheme for which the present invention is applicable, certain fiducial marks are normally incorporated to indicate beginnings of data blocks, sectors, or the like. These elements furnish sufficient data to permit a final check of the accuracy of transducer centering by suitable gating of the read signals. Such gating can be included in the equivalent of the read-write switching or track sorting logic 21 of FIGURE 5. By the use of such relatively permanent records, track drift can be substantially eliminated if it is of any consequence in the application of the present invention to a particular objective.

The explicit forms of recording surface or surfaces for use with this invention have not been described in detail. They may be as varied as wide tape, drums, discs or punched, magnetic, electrostatic, or optical. The paired transducers described in the preferred embodiment may be associated with tracks on a single recording surface or on two different recording surfaces such as opposite faces of a single recording disc or adjacent faces of a pair of recording discs. The functioning of the servo system is fundamentally independent of the choice of recording surface form and of the nature of the record involved.

Although the invention has been described and illustrated in detail, it is to be understood that the same is by way of illustration and example only, and is not to be taken by way of limitation; the spirit and scope of this invention being limited only by the terms of the appended claims.

I claim:

1. A servo system for positioning transducers at a selected track, said system comprising,
    transducer means for detecting data recorded on said tracks during the positioning of said transducer means transversely across said tracks, said data being recorded with phase related clock signals for coding the data on each track with distinguishing characteristics, said transducer means being disposed relative to said tracks for simultaneously detecting coded data from adjacent tracks, means responsive to the data from each track for generating a course positioning signal for said transducer means, means for discriminating between the characteristics of the data detected by said transducer means from each track for generating a fine positioning signal for said transducer means, means responsive to said fine positioning signal for positioning said transducer means at a select track location.

2. A servo system for positioning transducers at track locations, said system comprising, means for identifying the cyclic order of tracks from distinguishing characteristics of said tracks, said distinguishing characteristics comprising coded data recorded on said tracks, said means for identifying including transducer means for sensing signals representing data from tracks adjacent to the track over which the transducer means is passing, said signals having a changing magnitude relative to the location of said transducer means with respect to said tracks and relative to the direction of motion of said transducer means, including means for comparing the relative magnitudes of the signals sensed by said transducer means from tracks on both sides of the track location of said transducer means for generating a fine error signal representing the difference in said magnitudes, means responsive to the signals for indicating the position of transducer means relative to the recording track over which said transducer is passing, said means responsive including a first register means for indicating said location, a second register means for indicating a selected track location of said transducer means, means for generating a coarse error signal representing the difference in said locations for driving said transducer means towards the select track location.

3. A servo system for positioning transducers at track locations comprising, means for identifying the cyclic order of tracks from distinguishable characteristics of said tracks, means responsive to said identifying means for determining the track location of at least one transducer relative to a referenced track location, including means for deriving signals from said characteristics for centering a transducer with respect to a selected track location, said means for identifying comprises a plurality of transducers for simultaneously either recording or reading data on different synchronized tracks, means for generating a plurality of clock signals having a time phase difference for recording data on adjacent ones of said tracks with the characteristics of data on adjacent tracks being distinguishable, means for distinguished which clock was used for writing data read by selected ones of said transducers, means for correlating the signals received from the transducers with the clock signals for generating a code of a plurality of values which recur cyclically as the transducers are moved across the tracks 4. The combination as recited in claim 3 wherein said plurality of transducer means includes means for sensing signals from tracks on both sides of the parallel tracks over which the plurality of transducers are passing, said signals having a changing magnitude relative to the location of said transducers with respect to said tracks and relative to the direction of motion of said transducers, whereby said signals for centering said transducers with respect to a selected track are derived by comparing the relative magnitudes of said signals.

5. The combination as recited in claim 3 wherein the data is binary in nature and each clock provides timing signals alternating at regular intervals corresponding to a "0" bit or a "1" bit and wherein the two clocks are separated in time phase.

6. The combination as recited in claim 3 wherein the tracks from which data is read by said plurality of transducers comprise different portions of a single moving surface.

7. The combination as recited in claim 3 wherein the tracks from which data is read by said plurality of transducers comprise a plurality of synchronously moving surfaces.

References Cited

UNITED STATES PATENTS 3,292,168  12/1966  Gray _____________ 340—174.1

BERNARD KONICK, Primary Examiner

W. F. WHITE, Assistant Examiner